3,035,971
OPHTHALMIC COMPOSITION
Cliff L. Anderson, Harcourt, Iowa
No Drawing. Filed Dec. 16, 1957, Ser. No. 702,816
7 Claims. (Cl. 167—53.2)

This invention relates to a medicinal composition.

It is an object of the present invention to prepare a novel composition suitable for treating eye aliments.

An additional object is to prepare a novel pink eye medicine.

A further object is to prepare a liquid veterinary medicine that can be applied directly into the eye of an animal.

Still further objects and the entire scopy of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the preparation of a liquid composition containing ether, camphor gum and raw linseed oil. The liquid composition is suitable for treating pink eye in pigs, horses, cattle, sheep, and other livestock. It also is useful in treating eye ailments such as infection, foreign matter, and other eye ailments in animals.

Preferably the composition also includes boric acid. The advantage in having boric acid present is that it clears and washes the eye, takes out foreign matter and aids in healing.

*Example 1*

1½ ounces of camphor gum was ground until it was very fine. Then there was added 2½ ounces of diethyl ether. Next, 4 ounces of raw linseed oil was added and the composition well mixed to form a clear liquid. This mixture just filled a ½ pint bottle.

The liquid composition was administered to animals, e.g., cattle, horses and pigs, to treat pink eye and other eye diseases by applying it directly into the eye of the animal with a syringe. For best results in treating pink eye and other eye ailments in livestock, it was found that a small syringe full of liquid (approximately ½ ounce) should be shot into the eye on one day, another syringe full of liquid shot into the eye on the second day, the third day skipped and then another syringe full shot into the eye on the fourth day. This procedure can be repeated in extremely severe cases.

*Example 2*

1½ ounces of camphor gum was ground very fine and then 2½ ounces of diethyl ether were added to the powder. Next, 150 milligrams of boric acid was added to the liquid composition and finally 4 ounces of raw linseed oil. This liquid composition was used in the same manner as the composition of claim 1 and furthermore possessed the advantages previously disclosed for having boric acid present.

I claim:

1. A nonaqueous composition comprising diethyl ether, camphor gum and linseed oil.

2. A nonaqueous composition comprising diethyl ether, camphor gum and raw linseed oil in the proportions of 2½ ounces diethyl ether, 1½ ounces camphor gum and 4 ounces of raw linseed oil.

3. A composition consisting essentially of diethyl ether, camphor gum, linseed oil and boric acid.

4. A composition consisting of diethyl ether, camphor gum, linseed oil and boric acid in the proportions of 2½ ounces diethyl ether, 1½ ounces camphor gum, 4 ounces raw linseed oil and 150 milligrams boric acid.

5. The method of treating pink eye and other eye infections in livestock comprising applying directly to the eye of the livestock a nonaqueous composition comprising diethyl ether, camphor gum and linseed oil.

6. A method according to claim 5 wherein the composition also includes boric acid.

7. The method of treating pink eye in livestock comprising applying directly to the eye of the livestock a composition consisting of 2½ ounces diethyl ether, 1½ ounces camphor gum, 4 ounces raw linseed oil and 150 milligrams boric acid.

References Cited in the file of this patent

Bliss: Drug and Cosmetic Industry, March 1937, pages 342–344.
Merck Index, 6th Edition, 1952, page 194.
Merck Veterinary Manual, 1955, Merck and Co., Inc., Rahway, N.J., pp. 239, 240 and 247.
U.S. Dispensatory, 25th Ed., 1955, pages 234, and 759 Lippincott Co., Philadephia, Pa.
Lewis: The Ophthalmic Formulary, 1942, Charles C. Thomas, Springfield, Ill., pages 3, 9, 22, 25, 26, 62, 76, 134 and 151.